(12) United States Patent
Kerr et al.

(10) Patent No.: US 8,847,636 B2
(45) Date of Patent: Sep. 30, 2014

(54) IMPLEMENTING VOLTAGE FEEDBACK GATE PROTECTION FOR CMOS OUTPUT DRIVERS

(75) Inventors: Michael K. Kerr, Johnson City, NY (US); William F. Lawson, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 13/443,209

(22) Filed: Apr. 10, 2012

(65) Prior Publication Data

US 2013/0265085 A1  Oct. 10, 2013

(51) Int. Cl.
*H03B 1/00* (2006.01)
*H03K 3/00* (2006.01)
*H03K 5/12* (2006.01)
*H03L 5/00* (2006.01)

(52) U.S. Cl.
USPC ............ 327/112; 327/108; 327/170; 327/333

(58) Field of Classification Search
USPC .................................. 327/108, 112, 170, 333
See application file for complete search history.

(56) References Cited

U.S. PATENT DOCUMENTS

| 7,492,191 B2 * | 2/2009 | Kerr et al. ........................ 326/83 |
| 7,868,676 B2 * | 1/2011 | Koh et al. ..................... 327/170 |
| 8,330,504 B2 * | 12/2012 | Olson ........................... 327/108 |

* cited by examiner

*Primary Examiner* — Lincoln Donovan
*Assistant Examiner* — Colleen O Toole
(74) *Attorney, Agent, or Firm* — Joan Pennington

(57) ABSTRACT

A method and circuit for implementing protection for complementary metal oxide semiconductor (CMOS) output drivers, and a design structure on which the subject circuit resides are provided. An output driver stage transistor stack includes a plurality of series connected PFETs series connected with a plurality of series connected NFETs connected between upper and lower voltage supply rails. A pair of offset DC voltage levels provides respective gate voltages of an intermediate PFET and an intermediate NFET in the output driver stage transistor stack. A pair of pre-driver circuits receiving voltage level translated logic signals drive respective gate inputs of the upper PFET and the lower NFET in the output driver stage transistor stack. A voltage feedback circuit provides respective gate voltages of the PFET and NFET connected together in the output driver stage transistor stack.

16 Claims, 9 Drawing Sheets

US 8,847,636 B2

IMPLEMENTING VOLTAGE FEEDBACK GATE PROTECTION FOR CMOS OUTPUT DRIVERS

FIELD OF THE INVENTION

The present invention relates generally to the data processing field, and more particularly, relates to a method and circuit for implementing voltage feedback gate protection for complementary metal oxide semiconductor (CMOS) output drivers, and a design structure on which the subject circuit resides.

DESCRIPTION OF THE RELATED ART

As semiconductor technologies progress, smaller feature sizes translate to lower voltage device capabilities. Still legacy voltage input and output circuit interfaces are needed and a challenge is presented to develop compliant designs.

Solutions for the case where the supportable voltage required is two times (2×) the available device technology have been implemented. These implementations do not provide reliable device operation when using a 1.5 v device technology for a 3.3 v interface for example. High voltage device options such as LDMOS could be used but such high voltage device options are not always available and/or supportable by the defined technology of interest.

In order to use device technology where the supported voltage of the available devices is less than that of the desired interface voltage, stacking devices in the output driver stage is necessary.

FIGS. 1A and 1B illustrate a respective CMOS output stage with gate voltages described to work and protect the gates of the devices. FIG. 1A shows the existing implementation of a CMOS output driver stage including a transistor stack of P-channel field effect transistors (PFETs) TP1, TP2 and N-channel field effect transistors (NFETs) TN1, TN2 for the case where the device technology supports at least half of the required interface voltage DVDD. In this case, voltage VP is a static voltage that is set to a value that protects the gates of devices TP2 and TN1. This configuration will work when the CMOS driver or I/O cell is driving or receiving.

FIG. 1B shows a CMOS output driver stage that is needed for the case where the device technology is less than half of the required interface voltage. This triple stack output stage of PFETs TP1, TP2, TP3, and NFETs TN1, TN2, TN3 requires two intermediate voltages VPL and VPH that are used to protect devices TP2 and TN2 which is similar to devices TP2 and TN1 in FIG. 1A. These voltages are also used to power traditional switching circuits used to drive the gates of devices TP1 and TN3 in order to transmit data out of the I/O. The complexity that is presented with the triple stack CMOS output stage is the need to protect middle devices TP3 and TN1. In this case, the voltage on the gates of these devices has to follow the voltage that exists on the output of the I/O but not the full magnitude. The switching gates of TP3 and TN1 between VPL and VPH would protect these devices and provide a fully protected triple stack output driver stage.

For the CMOS triple stack output stage shown in FIG. 1B, if it were to be operated only as a driver, the gates of devices TP3 and TN1 could be driven using the data that is used to drive the gates of devices TP1 and TN3. This will not work for the case where the driver output stage needs to be put into high impedance or for when an input/output cell is receiving data.

FIG. 2 illustrates a problem with the operation of the CMOS triple stack output stage shown in FIG. 1B, where the devices TP1 and TN3 are in an off state and the output of this driver stage is stimulated or driven from an off chip source. When this happens, the data is coming from another source and cannot be used in the same fashion described above to protect gates TP3 and TN1 but these devices still need to be protected while data is being received. This is a problem that needs to be solved.

A need exists for a circuit having an efficient and effective mechanism for implementing protection for complementary metal oxide semiconductor (CMOS) output drivers.

SUMMARY OF THE INVENTION

Principal aspects of the present invention are to provide a method and circuit for implementing protection for complementary metal oxide semiconductor (CMOS) output drivers, and a design structure on which the subject circuit resides. Other important aspects of the present invention are to provide such method, circuit and design structure substantially without negative effects and that overcome many of the disadvantages of prior art arrangements.

In brief, a method and circuit for implementing protection for complementary metal oxide semiconductor (CMOS) output drivers in a transistor stack output drive stage, and a design structure on which the subject circuit resides are provided. An output driver stage transistor stack includes a plurality of series connected P-channel field effect transistors (PFETs) series connected with a plurality of series connected N-channel field effect transistors (NFETs) connected between an upper voltage supply rail and a lower voltage supply rail. A pair of offset DC voltage levels provides respective gate voltages of an intermediate PFET and an intermediate NFET in the output driver stage transistor stack. A pair of pre-driver circuits receiving voltage level translated logic signals drive respective gate inputs of the upper PFET and the lower NFET in the output driver stage transistor stack. A voltage feedback circuit provides respective gate voltages of the middle PFET and NFET connected together in the output driver stage transistor stack.

In accordance with features of the invention, the voltage feedback circuit detects the driver output node voltage and includes a plurality of resistors and a pair of capacitors. A respective resistor and capacitor are parallel connected and connected in series between the upper voltage supply rail and the lower voltage supply rail with a third resistor connected between the connection of resistors and a driver output PAD.

In accordance with features of the invention, each of the resistors of the voltage feedback circuit have a high impedance value, for example, in a range of k ohms.

In accordance with features of the invention, each of the capacitors of the voltage feedback circuit provides low AC impedance, suppressing overshoot and undershoot of the respective gate voltages.

In accordance with features of the invention, the voltage feedback circuit optionally is connected between the offset DC voltage levels.

In accordance with features of the invention, the voltage feedback circuit optionally provides separate paths to control the respective gate voltages of the middle PFET and NFET.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuits for implementing protection for complementary metal oxide semiconductor (CMOS) output drivers in accordance with preferred embodiments, and a design structure on which the subject circuits resides are provided.

Figure 1A:
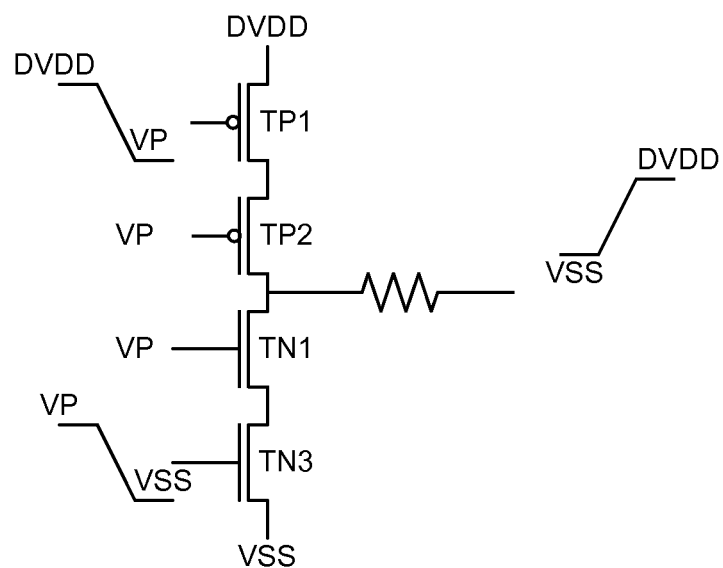
FIGS. 1A and 1B respectively provide a schematic diagram representation illustrating a prior art CMOS output driver stage including a transistor stack where the supported voltage of the available devices is less than that of the desired interface voltage.
Figure 1B:
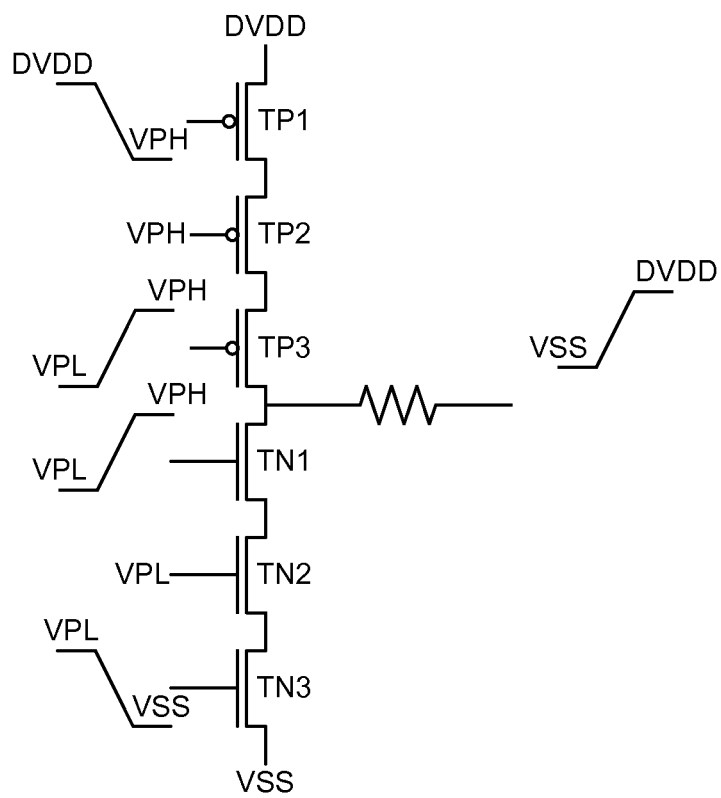
Figure 2:
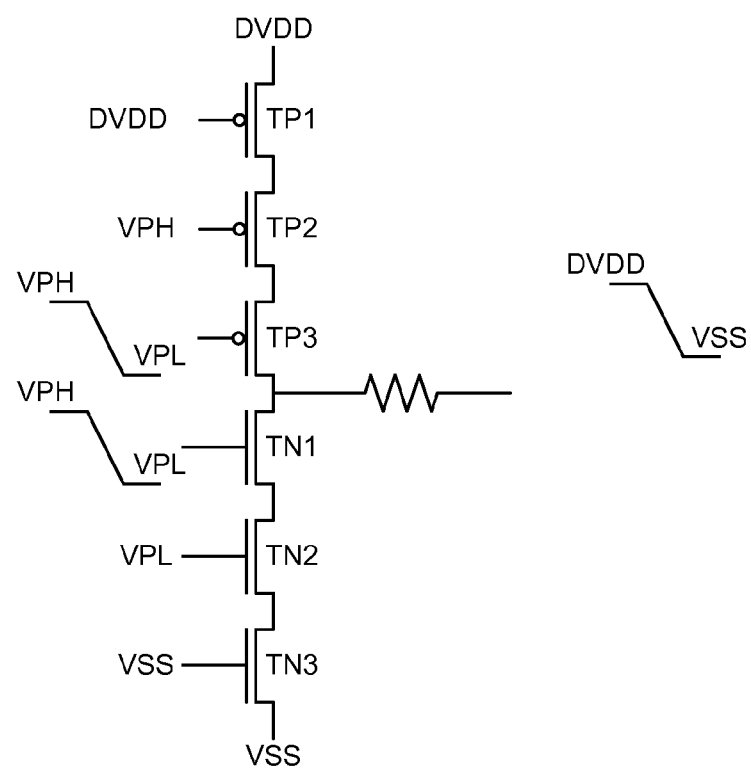
FIG. 2 illustrates a problem with the operation of the prior art CMOS triple stack output driver stage shown in FIG. 1B.
Figure 3:
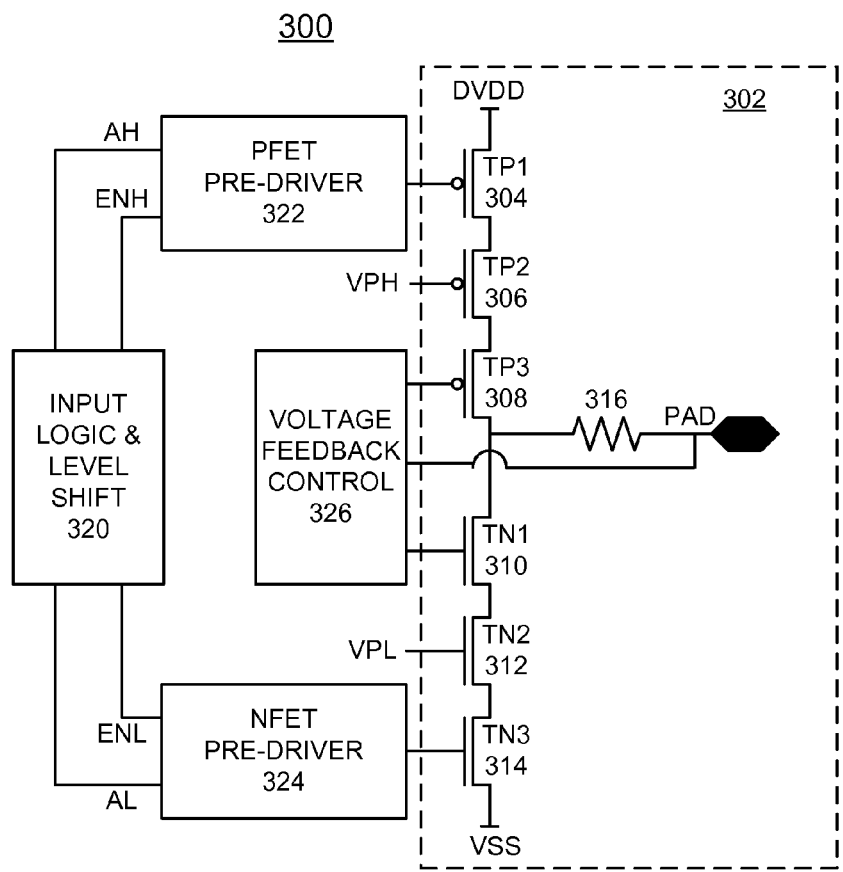
FIG. 3 is a schematic and block diagram representation illustrating example circuit for implementing protection for complementary metal oxide semiconductor (CMOS) output drivers in accordance with a preferred embodiment.

Having reference now to the drawings, in FIG. 3, there is shown an example circuit for implementing protection for complementary metal oxide semiconductor (CMOS) output drivers generally designated by the reference character 300 in accordance with a preferred embodiment.

Circuit 300 includes an output driver stage generally designated by the reference character 302. The output driver stage 302 includes a plurality of series connected P-channel field effect transistors (PFETs) TP1-TP3, 304, 306, 308 series connected with a plurality of series connected N-channel field effect transistors (NFETs) TN1-TN3, 310, 312, 314 connected between an upper voltage supply rail DVDD and a lower voltage supply rail VSS. The output driver stage 302 includes an output resistor 316 connected between a driver output PAD of the output driver stage and the common connection of PFET TP3, 308 and NFET TN1, 310.

Circuit 300 includes a predefined upper offset DC voltage level VPH and a predefined lower offset DC voltage level VPL providing a respective gate voltage to the intermediate PFET TP2, 306 and the intermediate NFET TN2, 312. The offset DC voltage levels VPH and VPL are used to provide bias protection for the CMOS output stage 302 and to allow appropriate driving levels of the switching devices. An input logic and level shifter 320 translates logic voltage domain signals to lower voltage domain and upper voltage domain signals and applies the translated voltage domain signals to respective lower and upper pre-driver circuits 324, 322 indicated at respective lines AL, ENL; and AH, ENH. The respective lower and upper pre-driver circuits 324, 322 drive respective gate inputs of the NFET TN3, 314 connected to the lower voltage supply rail VSS and of the PFET TP1, 304 connected to the upper voltage supply rail DVDD in the output driver stage 302. A voltage feedback circuit 326 with an input of the driver output PAD of the output driver stage transistor stack sets respective gate voltages of the PFET TP3, 308 and NFET TN1, 310.

Figure 4A:
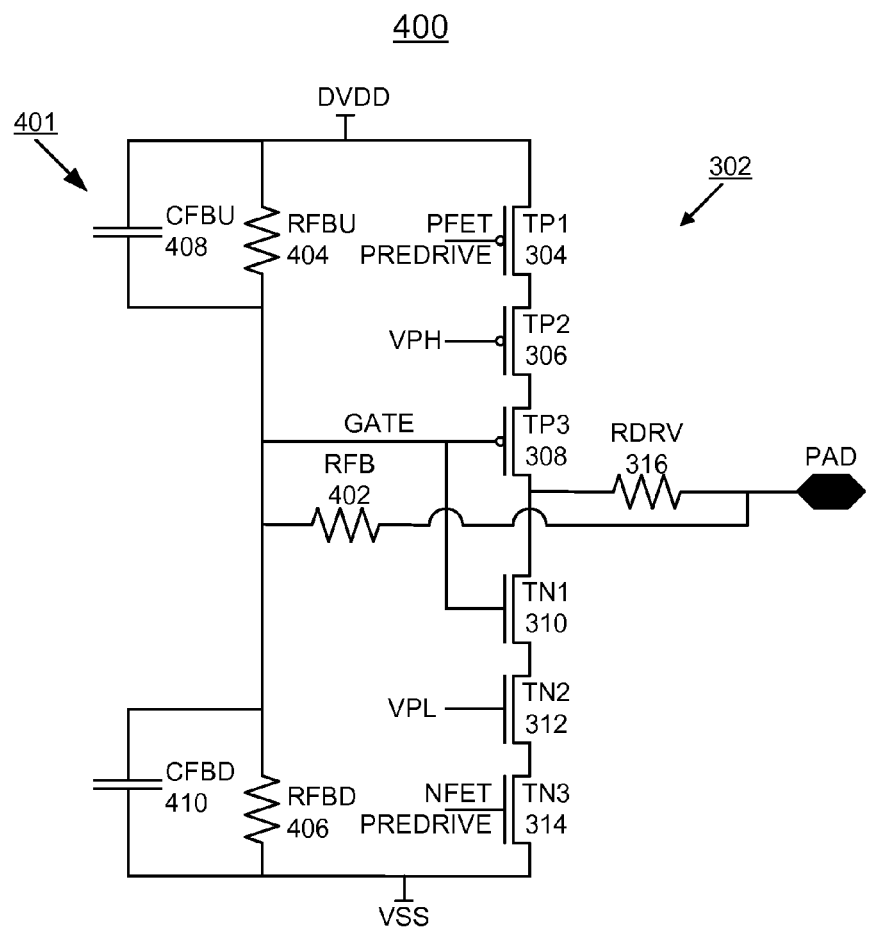
FIGS. 4A, 4B and 4C respectively provide a schematic and block diagram representation illustrating an example circuit for implementing protection for CMOS output drivers and waveform diagrams illustrating example drive mode and receive mode operations of the circuit of FIG. 4A in accordance with a preferred embodiment.
Figure 4B:
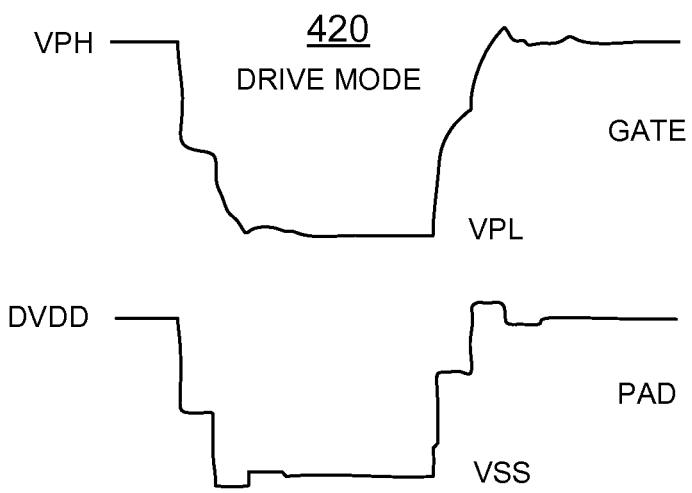
Figure 4C:
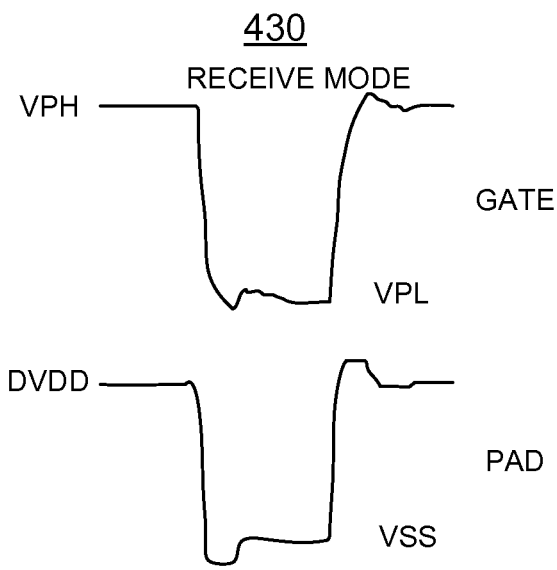

Referring to FIGS. 4A, 4B and 4C, there is shown an example circuit generally designated by the reference character 400 for implementing protection for CMOS output drivers and waveforms respectively generally designated by the reference characters 420, 430 illustrating example drive mode and receive mode operations of the circuit 400 in accordance with a preferred embodiment. Circuit 400 includes the CMOS output stage 302 with a pad voltage feedback circuit generally designated by the reference character 401. Pad voltage feedback circuit 401 protects the gates of the PFET TP3, 308 and NFET TN1, 310 in the CMOS output stage 302. Pad voltage feedback circuit 401 includes a plurality of resistors RFB 402, RFBU 404, RFBD 406 and a pair of capacitors CFBU 408 and CFBD 410. Resistor RFBU 404 and capacitor CFBU 408, and RFBD 406 and capacitor CFBD 410 are parallel connected and connected in series between the upper voltage supply rail DVDD and the lower voltage supply rail VSS. The resistor RFB 402 is connected between the connection of resistors RFBU 404, RFBD 406 and the driver resistor RDRV and driver output PAD.

The resistors RFB 402, RFBU 404, RFBD 406 have values of resistance selected to provide adequate protection of the gates of PFET TP3, 308 and NFET TN1, 310 and also allow the driver stage 302 to achieve valid output characteristics. Generally these impedance values of resistors RFB 402, RFBU 404, RFBD 406 would be relatively high in the order of k ohms to allow the driver stage 302 to drive valid levels. Given this, the node voltage GATE connected to the gates of PFET TP3, 308 and NFET TN1, 310 could have overshoots and undershoots of enough magnitude to defeat the purpose of this circuit 400 in the absence of capacitors CFBU 408 and CFBD 410. Without capacitors CFBU 408 and CFBD 410, such overshoots and undershoots could happen especially in the case when the output stage 302 is tri-stated or in high impedance state. Capacitors CFBU 408 and CFBD 410 suppresses the overshoot and undershoot providing low AC impedance during fast edge rates on the driver output PAD.

FIGS. 4B and 4C provide respective waveforms 420, 430 illustrating example drive mode and receive mode operations of the circuit 400 in accordance with a preferred embodiment. Voltage feedback circuit 401 effectively enables drive mode and receive mode operations of circuit 400, protecting the lower voltage devices. In both sets of waveforms 420, 430 the top waveform shows the GATE node voltage which switches between VPL and VPH, and the lower waveform shows the PAD node voltage switching between the upper voltage supply rail DVDD and the lower voltage supply rail VSS.

Figure 5A:
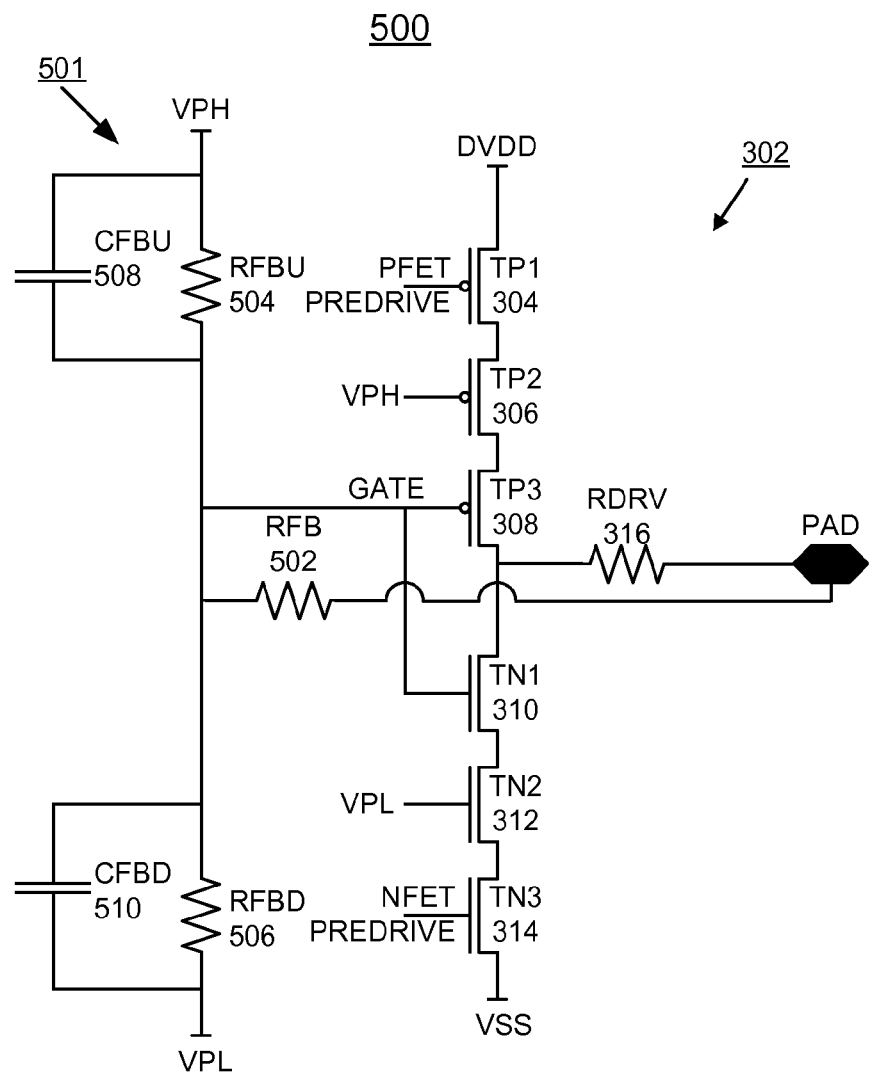
FIGS. 5A and 5B respectively provide a schematic and block diagram representation, each illustrating another example circuit for implementing protection for CMOS output drivers in accordance with a preferred embodiment.
Figure 5B:
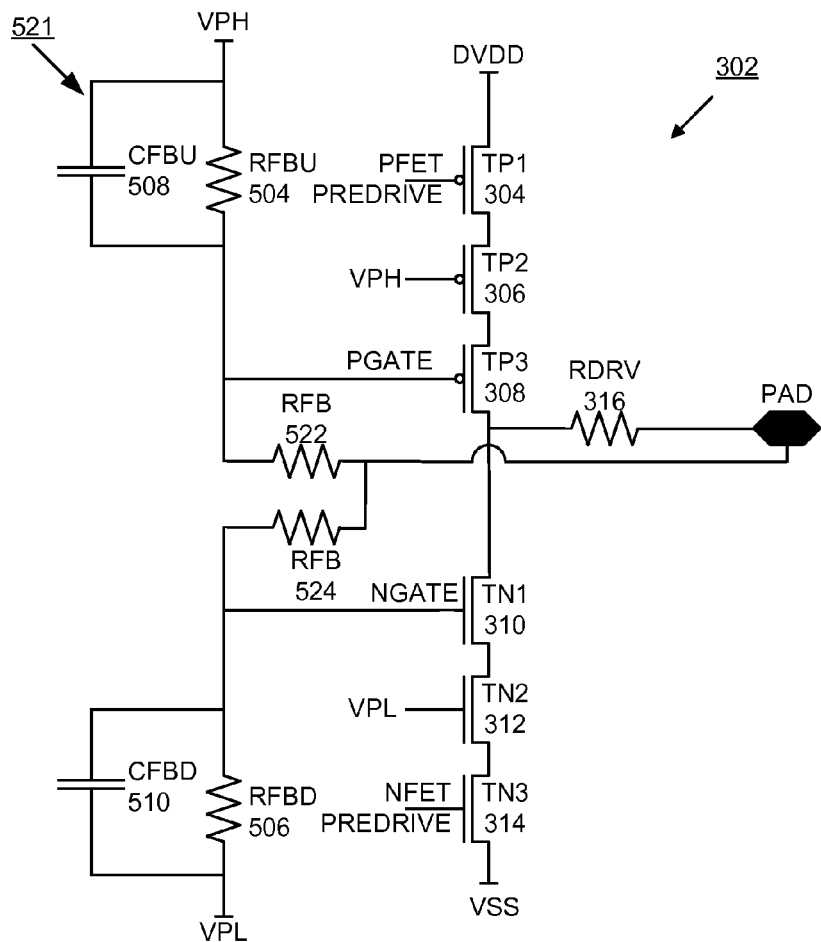

Referring to FIGS. 5A and 5B there are shown other example circuit respectively generally designated by the reference characters 500, 520 for implementing protection for CMOS output drivers in accordance with a preferred embodiment. Each of the circuit 500, 520 includes the CMOS output stage 302 with a respective pad voltage feedback circuit.

As shown in FIG. 5A, circuit 500 includes a pad voltage feedback circuit generally designated by the reference character 501. Pad voltage feedback circuit 501 protects the gates of the PFET TP3, 308 and NFET TN1, 310 in the CMOS output stage 302. Pad voltage feedback circuit 501 includes a plurality of resistors RFB 502, RFBU 504, RFBD 506 and a pair of capacitors CFBU 508 and CFBD 510. Resistor RFBU 504 and capacitor CFBU 508, and RFBD 506 and capacitor CFBD 510 are parallel connected and connected in series between the upper offset DC voltage level VPH and the lower offset DC voltage level VPL. The resistor RFB 502 is a feedback resistor connected to and the driver resistor RDRV and driver output PAD. The resistor RFB 502 is connected to resistors RFBU 504, RFBD 506 and the node voltage GATE connected to the gates of PFET TP3, 308 and NFET TN1, 310.

As shown in FIG. 5B, circuit 520 includes a pad voltage feedback circuit generally designated by the reference character 521. Pad voltage feedback circuit 521 protects the gates of the PFET TP3, 308 and NFET TN1, 310 in the CMOS output stage 302. Pad voltage feedback circuit 521 includes the resistors RFBU 504, RFBD 506 together with a pair of resistors RFB 522, 524 and the pair of capacitors CFBU 508 and CFBD 510. Resistor RFBU 504 and capacitor CFBU 508, and RFBD 506 and capacitor CFBD 510 are parallel connected and connected in series between the upper offset DC voltage level VPH and the lower offset DC voltage level VPL, as in pad voltage feedback circuit 501. The respective resistors RFB 522, 524 are respectively connected to the respective resistor RFBU 504, RFBD 506 and together connected to the driver resistor RDRV and driver output PAD. The respective resistors RFB 522, 524 provide a separate path to a control node voltage NGATE and a control node voltage PGATE independently. The respective resistors RFB 522, 524 are respectively connected to the node voltage PGATE connected to the gate of PFET TP3, 308 and the node voltage NGATE connected to the gate of NFET TN1, 310.

Each circuit 500 with pad voltage feedback circuit 501 and circuit 520 with pad voltage feedback circuit 521 allows more flexibility to control voltages on gates of PFET TP3, 308 and NFET TN1, 310 enabling drive mode and receive mode operations as circuit 400 with pad voltage feedback circuit 401 in accordance with a preferred embodiments.

Figure 6:
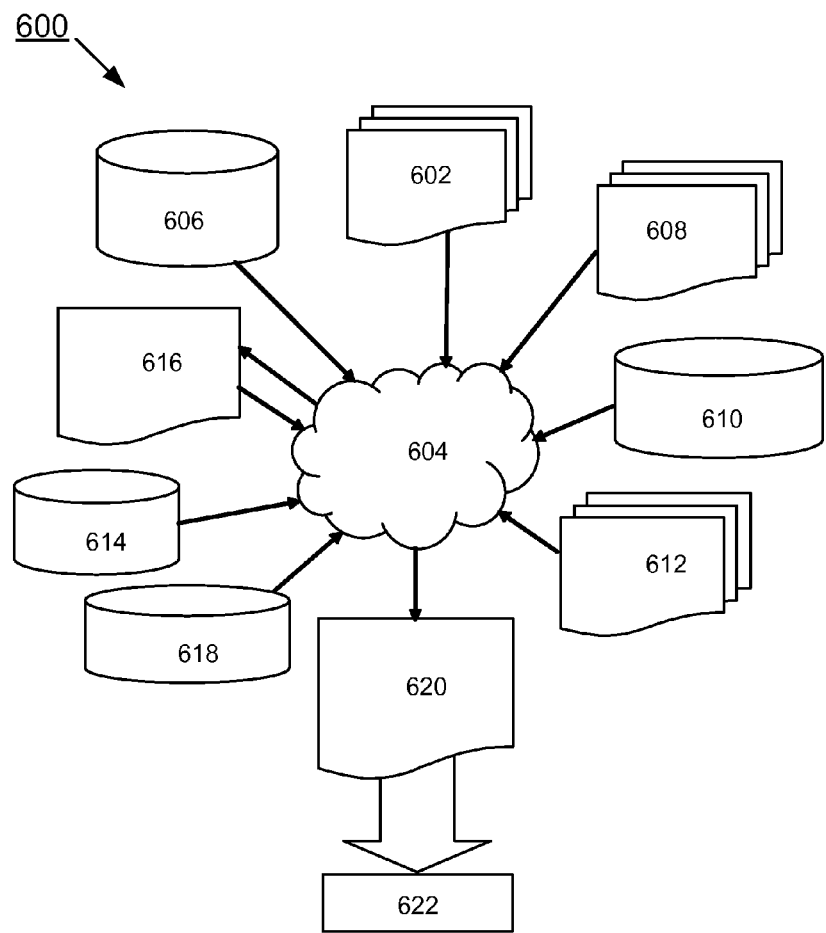
FIG. 6 is a flow diagram of a design process used in semiconductor design, manufacturing, and/or test.

FIG. 6 shows a block diagram of an example design flow 600. Design flow 600 may vary depending on the type of IC being designed. For example, a design flow 600 for building an application specific IC (ASIC) may differ from a design flow 600 for designing a standard component. Design structure 602 is preferably an input to a design process 604 and may come from an IP provider, a core developer, or other design company or may be generated by the operator of the design flow, or from other sources. Design structure 602 comprises circuits 300, 400, 500, and 520 in the form of schematics or HDL, a hardware-description language, for example, Verilog, VHDL, C, and the like. Design structure 602 may be contained on one or more machine readable medium. For example, design structure 602 may be a text file or a graphical representation of circuits 300, 400, 500, and 520. Design process 604 preferably synthesizes, or translates, circuits 300, 400, 500, and 520 into a netlist 606, where netlist 606 is, for example, a list of wires, transistors, logic gates, control circuits, I/O, models, etc. that describes the connections to other elements and circuits in an integrated circuit design and recorded on at least one of machine readable medium. This may be an iterative process in which netlist 606 is resynthesized one or more times depending on design specifications and parameters for the circuit.

Design process 604 may include using a variety of inputs; for example, inputs from library elements 608 which may house a set of commonly used elements, circuits, and devices, including models, layouts, and symbolic representations, for a given manufacturing technology, such as different technology nodes, 32 nm, 45 nm, 90 nm, and the like, design specifications 610, characterization data 612, verification data 614, design rules 616, and test data files 618, which may include test patterns and other testing information. Design process 604 may further include, for example, standard circuit design processes such as timing analysis, verification, design rule checking, place and route operations, and the like. One of ordinary skill in the art of integrated circuit design can appreciate the extent of possible electronic design automation tools and applications used in design process 604 without deviating from the scope and spirit of the invention. The design structure of the invention is not limited to any specific design flow.

Design process 604 preferably translates an embodiment of the invention as shown in FIGS. 3, 4A, 5A, and 5B along with any additional integrated circuit design or data (if applicable), into a second design structure 620. Design structure 620 resides on a storage medium in a data format used for the exchange of layout data of integrated circuits, for example, information stored in a GDSII (GDS2), GL1, OASIS, or any other suitable format for storing such design structures. Design structure 620 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 3, 4A, 5A, and 5B. Design structure 620 may then proceed to a stage 622 where, for example, design structure 620 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing protection for complementary metal oxide semiconductor (CMOS) output drivers in a transistor stack output drive stage including a plurality of series connected P-channel field effect transistors (PFETs) and series connected with a plurality of series connected N-channel field effect transistors (NFETs) connected between upper and lower voltage supply rails, said method comprising:

applying a first offset DC voltage level and a second offset DC voltage level to respective gate inputs of an intermediate PFET and an intermediate NFET in the output driver stage transistor stack;

driving respective gate inputs of the upper PFET and the lower NFET in the transistor stack output driver stage using a pair of pre-driver circuits receiving voltage level translated logic signals; and providing a voltage feedback circuit including a plurality of resistors and a pair of capacitors and providing a feedback input of a driver output of the transistor stack output driver stage input including first and second respective resistor and capacitor parallel connected pairs connected in series between the upper voltage supply rail and the lower voltage supply rail and connected to a third resistor connected to the driver output; and providing respective gate voltages to the PFET and NFET connected together in the transistor stack output driver stage with the voltage feedback circuit.

2. The method as recited in claim 1 includes providing a high impedance value for each of the resistors of the voltage feedback circuit.

3. The method as recited in claim 1 includes providing low AC impedance with the capacitors of the voltage feedback circuit for suppressing overshoot and undershoot of the respective gate voltages.

4. The method as recited in claim 1 includes providing said third resistor including a pair of resistors connected to the driver output and connecting the voltage feedback circuit between the offset DC voltage levels.

5. A circuit implementing protection for complementary metal oxide semiconductor (CMOS) output drivers in a transistor stack output drive stage including a plurality of series connected P-channel field effect transistors (PFETs) and series connected with a plurality of series connected N-channel field effect transistors (NFETs) connected between upper and lower voltage supply rails, said circuit comprising:
a first offset DC voltage level and a second offset DC voltage level providing respective gate inputs to an intermediate PFET and an intermediate NFET in the output driver stage transistor stack;
a pair of pre-driver circuits receiving voltage level translated logic signals and driving respective gate inputs of the upper PFET and the lower NFET in the output driver stage transistor stack; and
a voltage feedback circuit providing respective gate voltages to the PFET and NFET connected together in the output driver stage transistor stack; said voltage feedback circuit including a plurality of resistors and a pair of capacitors and receives a driver output input including first and second respective resistor and capacitor parallel connected pairs connected in series, and connected to a third resistor connected to the driver output.

6. The circuit as recited in claim 5 includes said first and second respective resistor and capacitor parallel connected pairs are connected in series with said third resistor including a pair of resistors connected to the driver output.

7. The circuit as recited in claim 5 includes said first and second respective resistor and capacitor parallel connected pairs are connected in series between the upper voltage supply rail and the lower voltage supply rail.

8. The circuit as recited in claim 5 wherein said first and second respective resistor and capacitor parallel connected pairs are connected in series between the first offset DC voltage level and the second offset DC voltage level.

9. The circuit as recited in claim 6 wherein each of said first and second respective resistor and capacitor parallel connected pairs a separate path to control the respective gate voltages to the PFET and NFET connected together in the output driver stage transistor stack.

10. The circuit as recited in claim 5 wherein each of said plurality of resistors has a high impedance value.

11. The circuit as recited in claim 5 wherein said capacitors of the voltage feedback circuit provide low AC impedance for suppressing overshoot and undershoot of the respective gate voltages.

12. A design structure embodied in a non-transitory machine readable storage medium used in a design process, the design structure comprising:
a circuit embodied in the non-transitory machine readable storage medium used in the design process, said circuit for implementing protection for complementary metal oxide semiconductor (CMOS) output drivers in a transistor stack output drive stage including a plurality of series connected P-channel field effect transistors (PFETs) and series connected with a plurality of series connected N-channel field effect transistors (NFETs) connected between upper and lower voltage supply rails, said circuit comprising:
a first offset DC voltage level and a second offset DC voltage level providing respective gate inputs to an intermediate PFET and an intermediate NFET in the output driver stage transistor stack;
a pair of pre-driver circuits receiving voltage level translated logic signals and driving respective gate inputs of the upper PFET and the lower NFET in the output driver stage transistor stack; and
a voltage feedback circuit providing respective gate voltages to the PFET and NFET connected together in the output driver stage transistor stack; said voltage feedback circuit including a plurality of resistors and a pair of capacitors and receives a driver output input including first and second respective resistor and capacitor parallel connected pairs connected in series, and connected to a third resistor connected to the driver output, wherein the design structure, when read and used in the manufacture of a semiconductor chip produces a chip comprising said circuit.

13. The design structure of claim 12, wherein the design structure comprises a netlist, which describes said circuit.

14. The design structure of claim 12, wherein the design structure resides on storage medium as a data format used for the exchange of layout data of integrated circuits.

15. The design structure of claim 12, wherein the design structure includes at least one of test data files, characterization data, verification data, or design specifications.

16. The circuit as recited in claim 12 wherein said plurality of resistors and a said pair of capacitors are connected in series between the upper voltage supply rail and the lower voltage supply rail.

* * * * *